US008773341B2

(12) United States Patent  
Takano et al.

(10) Patent No.: US 8,773,341 B2
(45) Date of Patent: Jul. 8, 2014

(54) LIQUID CRYSTAL DISPLAY DEVICE (75) Inventors: Takao Takano, Chiba (JP); Seiichi Kawashima, Mobara (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 904 days.

(21) Appl. No.: 12/270,183

(22) Filed: Nov. 13, 2008

(65) Prior Publication Data

US 2009/0121996 A1 May 14, 2009

(30) Foreign Application Priority Data

Nov. 14, 2007 (JP) ................................ 2007-295071

(51) Int. Cl.
*G09G 3/36* (2006.01)

(52) U.S. Cl.
USPC ............................................ 345/92; 349/139

(58) Field of Classification Search
CPC ................... G02F 1/134309; G02F 2201/123; G09G 3/3655
USPC ........................ 349/141, 43, 122, 139; 345/87
See application file for complete search history.

(56) References Cited

U.S. PATENT DOCUMENTS

| 6,611,310 | B2 * | 8/2003 | Kurahashi et al. ............ 349/141 |
| 6,784,964 | B2 * | 8/2004 | Nakayoshi et al. ........... 349/139 |
| 2003/0179331 | A1 * | 9/2003 | Kurahashi et al. ............ 349/122 |
| 2004/0178977 | A1 * | 9/2004 | Nakayoshi et al. ............. 345/87 |
| 2005/0105032 | A1 * | 5/2005 | Ono et al. ...................... 349/139 |
| 2006/0256270 | A1 * | 11/2006 | Nakayoshi et al. ........... 349/141 |
| 2007/0002252 | A1 * | 1/2007 | Kaneko et al. ................ 349/141 |

FOREIGN PATENT DOCUMENTS

| JP | 2003-195330 | 7/2003 |
| JP | 2005-284304 | 10/2005 |
| JP | 2005284304 A * | 10/2005 ............. G02F 1/139 |

* cited by examiner

Primary Examiner — Quan-Zhen Wang
Assistant Examiner — Troy Dalrymple
(74) Attorney, Agent, or Firm — Antonelli, Terry, Stout & Kraus, LLP.

(57) ABSTRACT

A liquid crystal display device including a liquid crystal panel including liquid crystal sealed between a pair of substrates; a plurality of gate signal lines and a plurality of drain signal lines formed to cross each other on one of said pair of substrates; a pixel region surrounded by a pair of adjacent gate signal lines and a pair of adjacent drain signal lines; a thin film transistor provided in the pixel region and connected to at least one of the pair of adjacent gate signal lines and at least one of the pair of drain signal lines; a pixel electrode provided in the pixel region and supplied with a video signal via the thin film transistor; and a counter electrode provided in the pixel region and supplied with a reference signal via a counter voltage signal line, the reference signal being a reference for the video signal.

21 Claims, 9 Drawing Sheets

LIQUID CRYSTAL DISPLAY DEVICE

The present application claims priority over Japanese Application JP 2007-295071 filed on Nov. 14, 2007, the content of which is hereby incorporated into this application by reference.

BACKGROUND OF THE INVENTION (1) Field of the Invention

The present invention relates to a liquid crystal display device, and in particular, to a so-called IPS (in-plane switching) system active matrix type liquid crystal display device.

(2) Related Art Statement

Active matrix type liquid crystal display devices are provided with a number of gate signal lines which extend in the direction x and are aligned in the direction y, and a number of drain signal lines which extend in the direction y and are aligned in the direction x on the surface of one of a pair of substrates provided so as to face each other with liquid crystal in between on the liquid crystal side, and have regions surrounded by a pair of adjacent gate signal lines and a pair of adjacent drain signal lines as pixel regions.

Each pixel region is provided with a thin film transistor which is turned on by a scanning signal coming from one gate signal line, and a pixel electrode to which a video signal is supplied from one drain signal line via the thin film transistor that is turned on.

In addition, IPS system liquid crystal display devices are formed so that the other electrode (counter electrode) which makes a pair with the above described pixel electrode is formed on the surface on the substrate side where the pixel electrode is formed, and liquid crystal is driven between the pixel electrode and the counter electrode by means of an electrical field which includes a component parallel to the surface of the above described substrate (in some cases referred to as lateral electrical field system).

In addition, liquid crystal displays where counter electrodes are formed of a transparent conductive film covering the surface at the center of each pixel, but not a thin strip in the periphery, and the pixel electrodes are formed of a transparent conductive film having a number of slits which faces each counter electrode with an insulating film in between on the counter electrode, and as a result, the opening ratio of the pixels is much higher, are known.

In this case, the counter electrodes are formed on the substrate in the same layer as counter voltage signal lines and connected to the counter voltage signal lines, and thus electrically connected to the counter voltage signal lines.

The counter voltage signal lines are formed of the same material as the above described gate signal lines, and a metal material is usually used. As a result, a reference signal which becomes a reference for a video signal can be supplied to the counter electrodes via the above described counter electrode signal lines having a low electrical resistance.

The following Patent Document 1, for example, discloses a liquid crystal display device having such a configuration.

(Patent Document 1) Japanese Unexamined Patent Publication 2005-284304

SUMMARY OF THE INVENTION

Problem to be Solved by the Invention

However, in thus formed liquid crystal display devices, the counter voltage signal lines are generally formed in the same layer as the gate signal lines, for reasons relating to the process, and therefore, the counter voltage signal lines must be placed inside pixel regions surrounded by a pair of adjacent gate signal lines and a pair of adjacent drain signal lines.

The counter voltage signal lines are formed of a metal material, and thus have light blocking properties. Therefore, the region where the counter voltage signal lines are formed in the pixel regions becomes a region where light is blocked, and this has become a factor in preventing the opening ratio from increasing.

An object of the present invention is to provide a liquid crystal display device where the opening ratio of pixels is higher.

Means for Solving Problem

The gist of typical inventions from among the inventions disclosed in the present application is briefly described below.

(1) The liquid crystal display device according to the present invention is provided with: a number of gate signal lines and a number of drain signal lines formed so as to cross the gate signal lines provided on the surface of one of a pair of substrates provided so as to face each other with liquid crystal in between on the liquid crystal side; and thin film transistors connected to a gate signal line and a drain signal line, pixel electrodes to which a video signal is supplied from a drain signal line via a thin film transistor, and a counter electrode to which a reference signal which becomes a reference for the video signal is supplied via a counter voltage signal line provided in pixel regions surrounded by a pair of adjacent gate signal lines and a pair of adjacent drain signal lines, and is characterized in that the above described counter electrodes are formed of a transparent conductive film, the above described pixel electrodes are formed of a transparent conductive film and on the liquid crystal side relative to the above described counter electrodes via an insulating film, and the above described counter voltage signal lines are formed in the direction in which the above described gate signal lines run so as to overlap with the above described gate signal lines via the above described insulating film and be electrically connected to the above described counter electrodes via contact holes created in the above described insulating film.

(2) The liquid crystal display device according to the present invention has the same configuration as (1), and is characterized in that the above described counter voltage signal lines are provided with protrusions which extend in such a direction as to cross the counter voltage signal lines, and the protrusions are formed so as to cover contact holes created in the above described insulating film.

(3) The liquid crystal display device according to the present invention has the same configuration as (2), and is characterized in that the above described counter voltage signal lines are formed of a multilayer body of a transparent conductive film and a metal film.

(4) The liquid crystal display device according to the present invention has the same configuration as (3), and is characterized in that the contour of the above described metal film is within the contour of the above described transparent conductive film when the above described counter voltage signal lines are viewed in a plane.

(5) The liquid crystal display device according to the present invention has the same configuration as (3), and is characterized in that the above described protrusions are formed of a multilayer body of a transparent conductive film and a metal film.

(6) The liquid crystal display device according to the present invention has the same configuration as (3), and is characterized in that the above described protrusions are formed only of a transparent conductive film.

(7) The liquid crystal display device according to the present invention has the same configuration as (3), and is characterized in that the above described counter voltage signal lines are formed of a metal film.

(8) The liquid crystal display device according to the present invention has the same configuration as (1), and is characterized in that the above described facing voltage signal lines cover part or the entirety of the above described gate signal lines in the direction parallel to the direction in which the above described drain signal lines run.

(9) The liquid crystal display device according to the present invention has the same configuration as (1), and is characterized in that the above described pixel electrodes and the above described counter voltage signal lines are formed in the same layer.

(10) The liquid crystal display device according to the present invention has the same configuration as (1), and is characterized in that the above described counter electrodes and the above described gate signal lines are formed in the same layer.

Here, the present invention is not limited to the above described configuration, and various modifications are possible, as long as the technical idea of the present invention is not deviated from.

Effects of the Invention

In the liquid crystal display device according to the present invention, the opening ratio of pixels is higher.

EXPLANATION OF SYMBOLS

SUB1, SUB2 . . . substrate
SL . . . sealing material
AR . . . liquid crystal display region
GL . . . gate signal line
DL . . . drain signal line
CL . . . counter voltage signal line
PJ . . . protrusion
TFT . . . thin film transistor
PX . . . pixel electrode
CT . . . counter electrode
GI . . . gate insulating film
PAS . . . protective film
TH1, TH2 . . . contact hole
OXL . . . transparent conductive film
MTL . . . metal film
RES(s), RES(p) . . . photoresist film

DETAILED DESCRIPTION OF THE INVENTION (Best Mode for Carrying Out the Invention)
<First Embodiment>

In the following, the liquid crystal display device according to an embodiment of the present invention is described in reference to the drawings.

<Configuration of Entirety>

Figure 2:
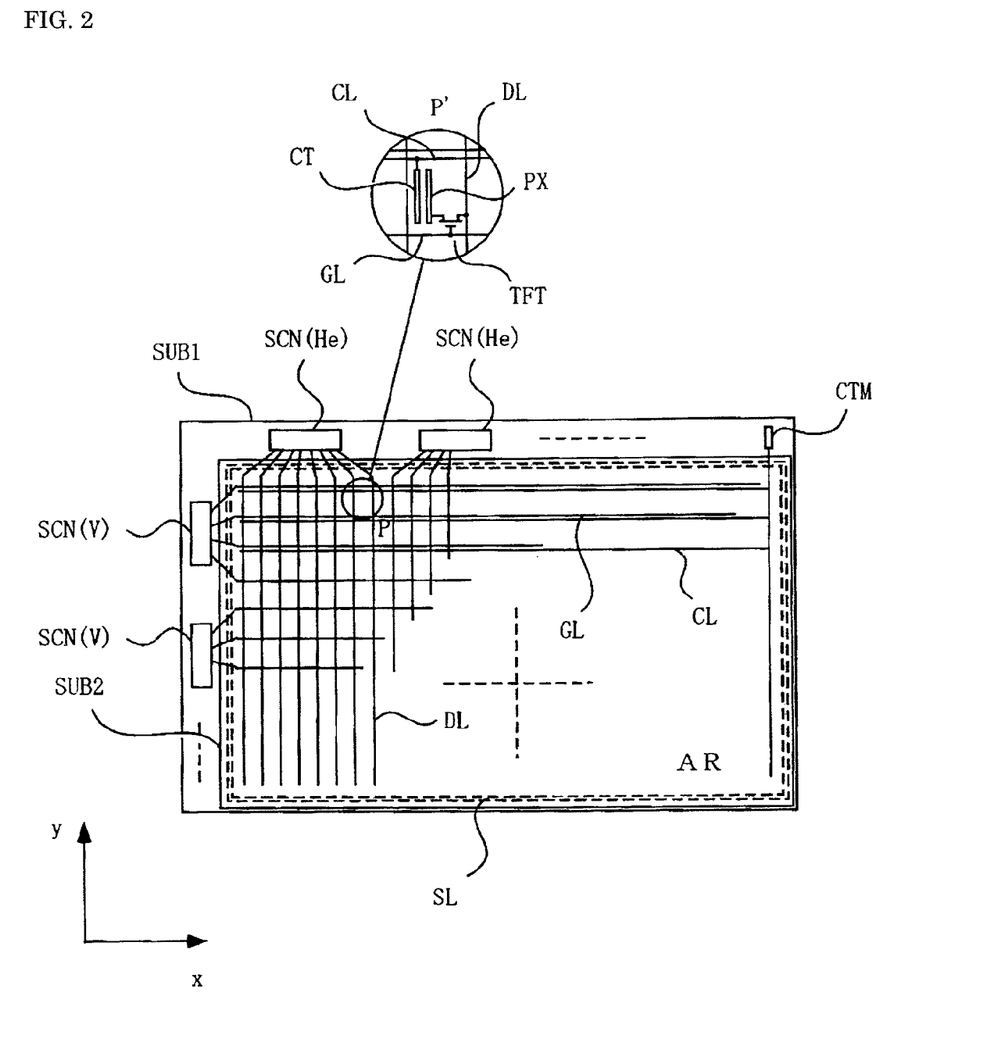
FIG. 2 is a plan diagram showing the entirety of the liquid crystal display device according to one embodiment of the present invention.

FIG. 2 is a diagram showing the configuration of the entirety of the liquid crystal display device according to one embodiment of the present invention.

In FIG. 2, the liquid crystal display device has a pair of substrates SUB1 and SUB2 which are provided so as to face each other and made of glass, for example, as outer walls, and liquid crystal (not shown) is sandwiched between the substrates SUB1 and SUB2.

The liquid crystal is sealed in by a sealing material SL which also works to secure the substrate SUB2 to the substrate SUB1, and the region surrounded by the sealing material SL forms a liquid crystal display region AR.

The substrate SUB1 is formed so as to have a larger area than the substrate SUGB2, and has regions which are exposed from under the substrate SUB2 on the left side and top side in the figure, for example.

A number of semiconductor devices SCN(V) are mounted and aligned in the region on the left side of the substrate SUB1, and a number of semiconductor devices SCN(He) are mounted and aligned in the region on the top side of the substrate SUB1. The above described number of semiconductor devices SCN(V) form a scanning signal drive circuit and are connected to the below described gate signal lines GL, and the above described number of semiconductor devices SCN(He) form a video signal drive circuit and are connected to the below described drain signal lines DL.

Gate signal lines GL which extend in the direction x and are aligned in the direction y in the figure and drain signal lines DL which extend in the direction y and are aligned in the direction x are formed within the liquid crystal display region AR on the surface of the substrate SUB1 on the liquid crystal side.

Rectangular regions surrounded by a pair of adjacent gate signal lines GL and a pair of adjacent drain signal lines DL form regions where a pixel is formed, and thus, the pixels are arranged in a matrix within the liquid crystal display region AR.

The end portion of the above described gate signal lines GL on the left extends to the outside of the liquid crystal display region AR beyond the sealing material SL, and is connected to the output terminals of nearby semiconductor devices SCN(V) so that a scanning signal (voltage) can be supplied by the semiconductor devices SCN(V).

The end portion of the above described drain signal lines DL on the top side extends to the outside of the liquid crystal display region AR beyond the sealing material SL and is connected to the output terminals of nearby semiconductor devices SCN(He) so that a video signal (voltage) can be supplied by the semiconductor devices SCN(He).

The above described pixels are provided as shown within the circle P', which is an enlargement of the circle P in the figure, with a thin film transistor TFT which is turned on by a scanning signal (voltage) from a gate signal line GL, a pixel electrode PX to which a video signal (voltage) is supplied from a drain signal line DL via the thin film transistor TFT that is turned on, and a counter electrode CT to which a reference signal (voltage) is applied, so that an electrical field is generated as a result of the difference in potential with the pixel electrode PX. The pixel electrode PX and the counter electrode CT are formed on the same substrate SUB1, and the electrical field partially includes a component of the electrical field parallel to the surface of the substrate SUB1, and liquid crystal displays where such an electrical field moves (drives) molecules in the liquid crystal are referred to as being of a lateral electrical field type.

Here, the above described reference signal is applied to the above described counter electrode CT through a counter voltage signal line CL which is placed parallel to the gate signal lines GL, and the counter voltage signal line CL extends beyond the above described sealing material SL and is connected to a counter voltage terminal CTM formed on the surface of the substrate SUB1.

In the above described embodiment, the scanning signal drive circuits V and the video signal drive circuits HE are formed and mounted on the substrate SUB1. However, the invention is not limited to this, and semiconductor devices formed in so-called tape carrier systems (semiconductor devices where semiconductor chips are mounted on a flexible substrate) may be provided so as to cross the substrate SUB1 and a printed circuit board, not shown, in the configuration.

<Configuration of Pixels>

Figure 1A:
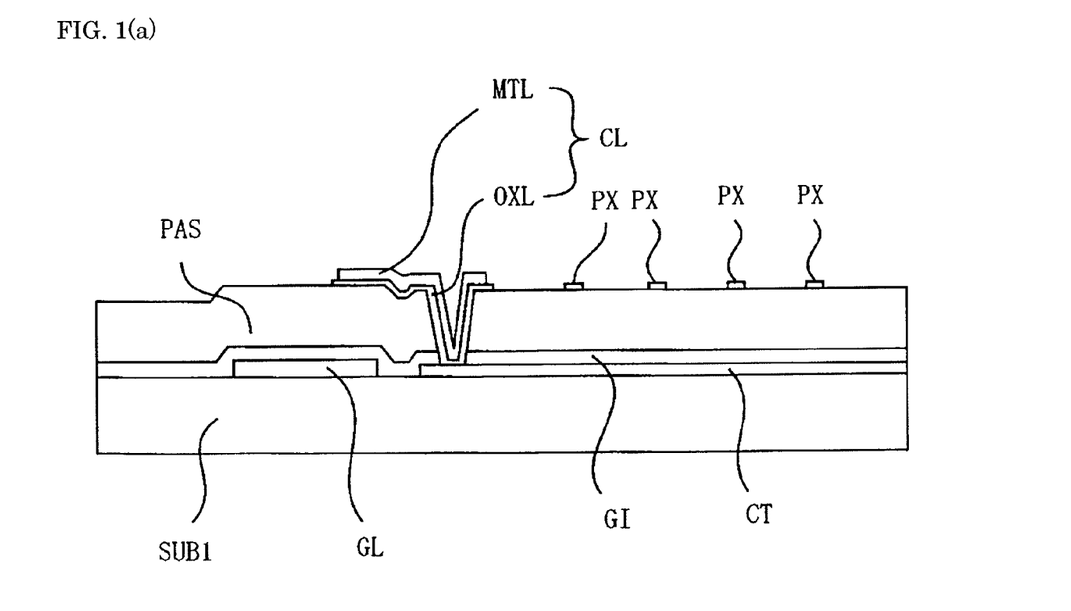
FIGS. 1(a) and 1(b) are diagrams showing the configuration of a main portion of the liquid crystal display device according to one embodiment of the present invention.
Figure 3:
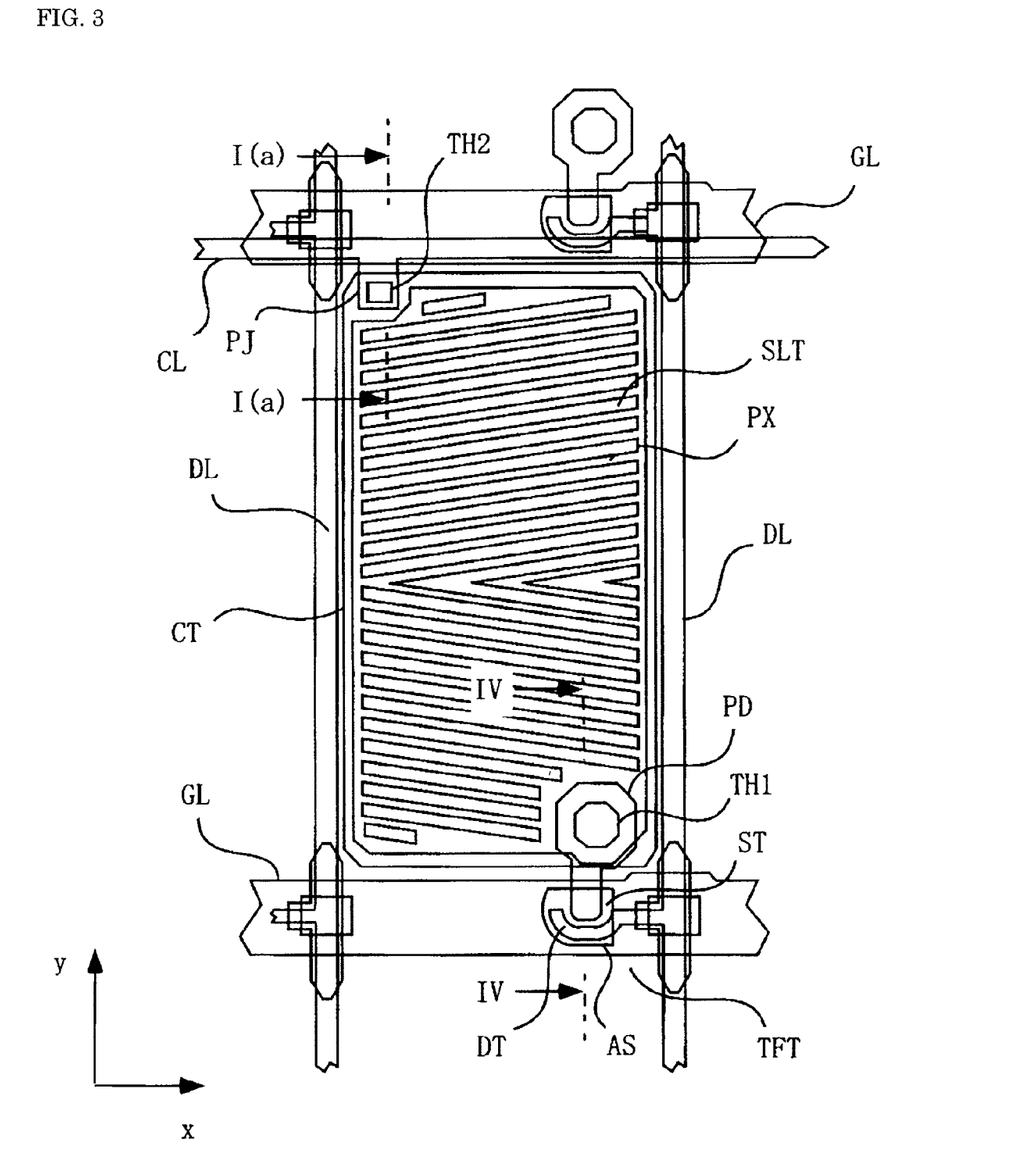
FIG. 3 is a plan diagram showing a pixel in the liquid crystal display device according to one embodiment of the present invention.
Figure 4:
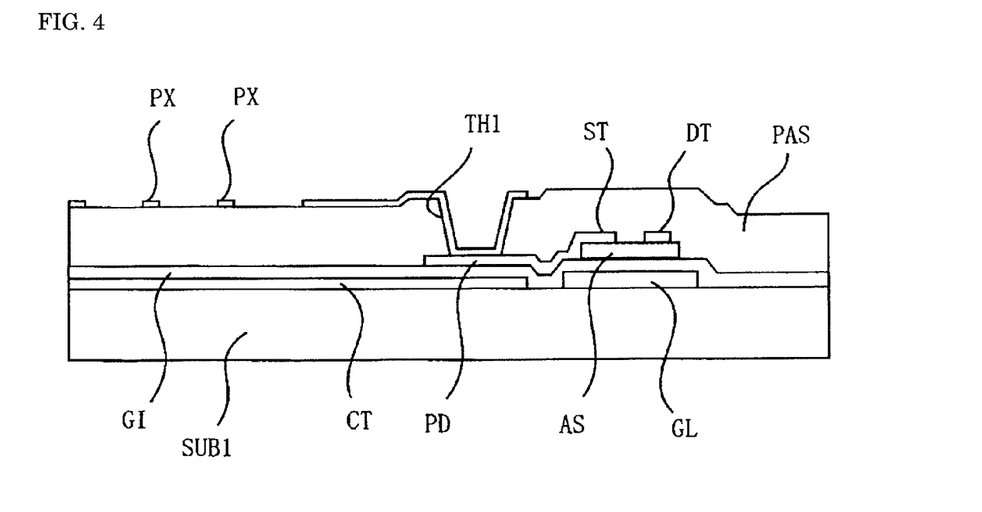
FIG. 4 is a cross sectional diagram along line VI-VI in FIG. 3.

FIG. 3 is a plan diagram showing the structure of a pixel of the above described liquid crystal panel PNL on the substrate SUB1 side according to one embodiment. The respective pixels provided on the top, bottom, left and right of the pixel shown in FIG. 3 have the same configuration as this pixel. In addition, FIG. 4 is a cross sectional diagram along line IV-IV in FIG. 3, and FIG. 1(a) is a cross sectional diagram along line I(a)-I(a) in FIG. 3.

First, gate signal lines GL which extend in the direction x in the figure are formed on the surface (front surface) of the substrate SUB1 on the liquid crystal side so as to be aligned in the direction y.

These gate signal lines GL form pixel regions in regions surrounded by these gate signal lines and the below described drain signal lines DL.

In addition, counter electrodes CT made of a transparent conductive film, such as of ITO (indium tin oxide), are formed in the pixel regions on the front surface of the above described substrate SUB1. These counter electrodes CT form surface electrodes covering the major portions at the center of the regions but not a thin strip in the periphery of the above described pixel regions.

In addition, a gate insulating film GI (see FIGS. 1(a) and 4) is formed on the front surface of the TFT substrate SUB1 so as to cover the above described gate signal lines GL and the counter electrodes CT. This gate insulating film GI functions as a gate insulating film for the thin film transistors TFT in regions where the below described tin film transistors TFT are formed, and the film thickness and the like are set accordingly.

An amorphous semiconductor layer AS made of amorphous silicon, for example, is formed on the upper surface of the above described gate insulating film GI and in such portions as to overlap with part of the above described gate signal lines GL. This semiconductor layer AS is to form a semiconductor layer of the above described thin film transistors TFT.

In addition, the semiconductor layers AS' formed at the same time as the above described semiconductor layer AS are formed at intersections between the gate signal lines GL and the below described drain signal lines DL. These semiconductor layers AS' function as an interlayer insulating film between the gate signal lines GL and the above described drain signal lines DL, together with the above described gate insulating film GI.

In addition, drain signal lines DL are formed so as to extend in the direction y in the figure, and these drain signal lines DL extend to the region where the thin film transistor TFT is formed in a portion of the intersections with the gate signal lines GL, and these extending portions reach the upper surface of the above described semiconductor layer AS so as to form the drain electrodes of the thin film transistors TFT.

In addition, the drain signal lines DL and the source electrodes ST of the above described thin film transistors TFT formed at the same time as the drain electrodes DL are formed so as to face the above described drain electrodes DT above the above described semiconductor layer AS. In addition, the above described source electrodes ST extend from the semiconductor layer AS to a region where the semiconductor layer AS is not formed, and these extending portions form pad portions PD. These pad portions PD make electrical and physical connection with the below described pixel electrodes PX.

The above described drain electrodes DT are formed in an arc pattern so as to surround the end portions of the above described source electrodes ST, and thus make the channel width of the tin film transistors TFT greater.

Here, when the above described semiconductor layer AS is formed on the insulating film GI, impurities of a high concentration are doped through the front surface, for example, and the above described drain electrodes DT and source electrodes ST are formed and patterned, and after that, the high concentration impurity layer formed in regions other than regions where drain electrodes DT and source electrodes ST are formed is etched and removed using the drain electrodes DT and the source electrodes ST as a mask. This is because the high concentration impurity layer (not shown) remains between the semiconductor layer AS and the drain electrodes DT, as well as between the semiconductor layer AS and the source electrodes ST, so that the impurity layer forms an ohmic contact layer.

As a result, the above described thin film transistors TFT are formed as MIS (metal insulator semiconductor) type transistors having a so-called reverse staggered structure, where part of the gate signal lines GL are used as gate electrodes.

Here, in MIS type transistors, the drain electrode DT and the source electrode ST are switched, depending on the application of a bias, and in the description in this specification, the electrode connected to the drain signal line DL is referred to as drain electrode DT, and the electrode connected to the pixel electrode PX is referred to as source electrode ST for the sake of convenience.

A protective film PAS (see FIGS. 1(a) and 4) is formed of a silicon nitride film, for example, on the surface of the TFT substrate SUB1 so as to coat the above described thin film transistors TFT.

This protective film PAS prevents the thin film transistors TFT from making direct contact with the liquid crystal, and thus, functions to prevent the properties of the thin film transistors TFT from deteriorating, and also functions as a dielectric film for forming holding capacitors between the above described counter electrodes CT and the below described pixel electrodes PX.

In addition, pixel electrodes PX are formed on the upper surface of the protective film PAS of a transparent conductive film, such as of ITO (indium tin oxide).

The above described pixel electrodes PX overlap with the above described counter electrodes CT and are formed in regions covering the major portions at the center but not a thin strip in the periphery of the above described pixel regions so as to have a number of slits SLT.

That is to say, a number of slits SLT are created so as to form a slight angle with the direction in which the gate signal lines GL run.

A number of slits SLT in a pixel electrode PX are created so as to extend in such a direction as to form an angle of +θ degrees with the direction in which the gate signal lines GL run in one of the two regions gained by dividing the region of the pixel into an upper and a lower portion in the figure, and are created so as to extend in such a direction as to form an angle of −θ degrees in the other region. A so-called multi-domain system is adopted, and the disadvantage of there being discoloration depending on the view angle can be overcome in the configuration.

The thus formed pixel electrodes PX are electrically connected to the above described pad portions PD (source electrodes ST of thin film transistors TFT) through contact holes TH1 created in the above described protective film PAS.

In addition, counter voltage signal lines CL are formed of a multilayer body where a transparent conductive film OXL, such as of ITO (indium tin oxide), and a metal film MTL, such as of aluminum, molybdenum or the like, are layered on the upper surface of the above described protective film PAS in this order in this embodiment.

The configuration of the counter voltage signal lines CL of the multilayer body where the transparent conductive film OXL and the metal film MTL are layered in this order is described in detail below.

The thus formed counter voltage signal lines CL are formed in the direction in which the gate signal lines GL run so as to overlap with the above described gate signal lines GL.

In addition, the counter voltage signal lines CL are provided with protrusions PJ which extend in such a direction as to cross part of the counter voltage signal lines, and these protrusions PJ are electrically connected to the above described counter electrodes CT through contact holes TH2 created in the above described protective film PAS. As a result, a reference signal is supplied to the above described counter electrodes CT via the above described counter voltage signal lines CL.

The counter voltage signal lines CL are formed in this manner, and thus the above described contact holes TH2 for the above described counter electrodes CT are created, and the side which faces the above described counter voltage signal lines CL can be in the vicinity of the above described gate signal lines GL. That is to say, the counter voltage signal lines CL which include a metal film are not located between counter electrodes CT and gate signal lines. As a result, the area of the transparent region can be increased in the pixel regions, so that the opening ratio of the pixels can be increased.

Figure 8A:
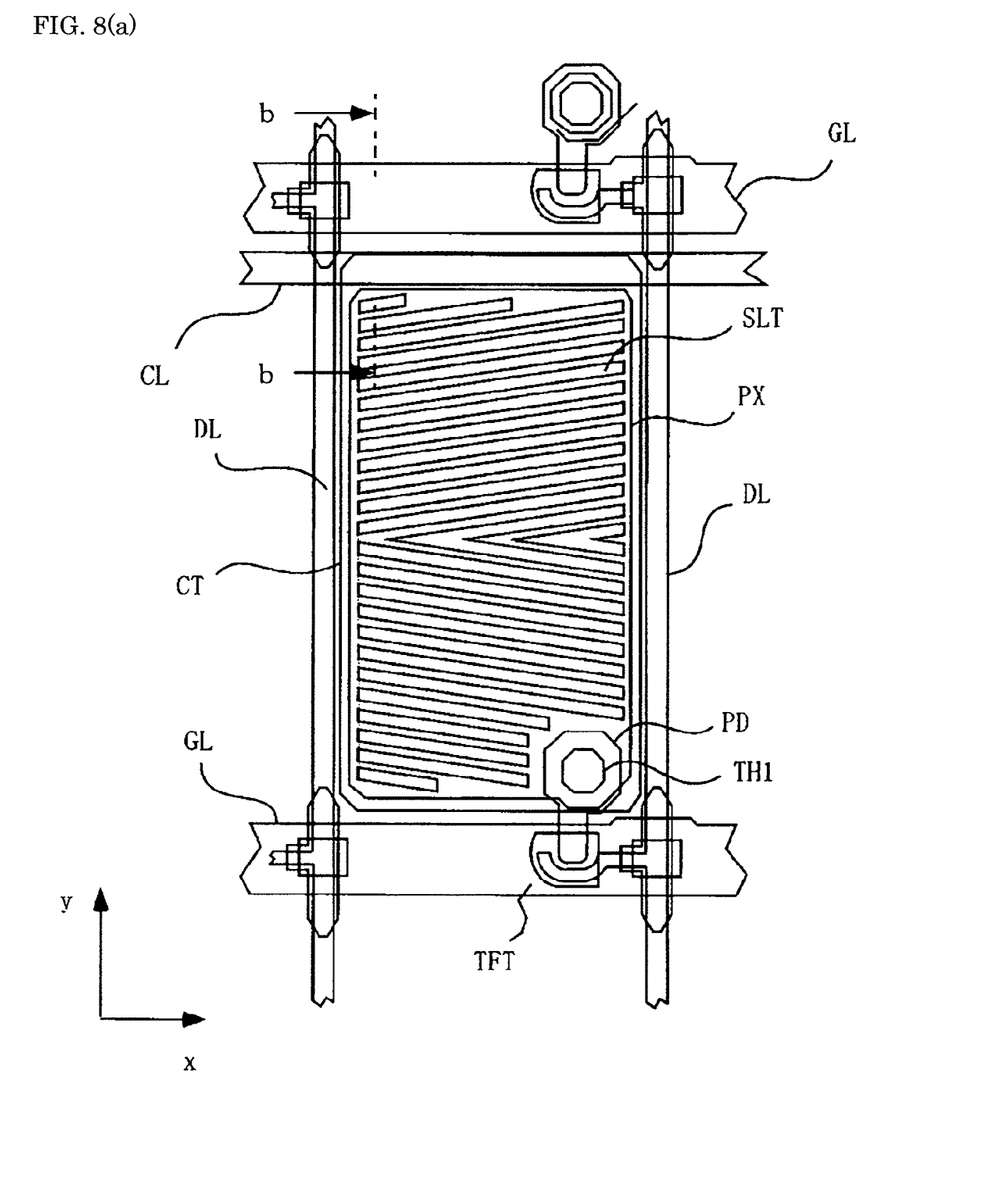
FIGS. 8(a) and 8(b) are diagrams showing the configuration of an example of a conventional liquid crystal display device.

Incidentally, FIG. 8(a) is a plan diagram showing an example of a conventional liquid crystal display device, and shows the structure of a pixel, as does FIG. 3. In addition, FIG. 8(b) is a cross sectional diagram along line b-b in FIG. 8(a).

Figure 8B:
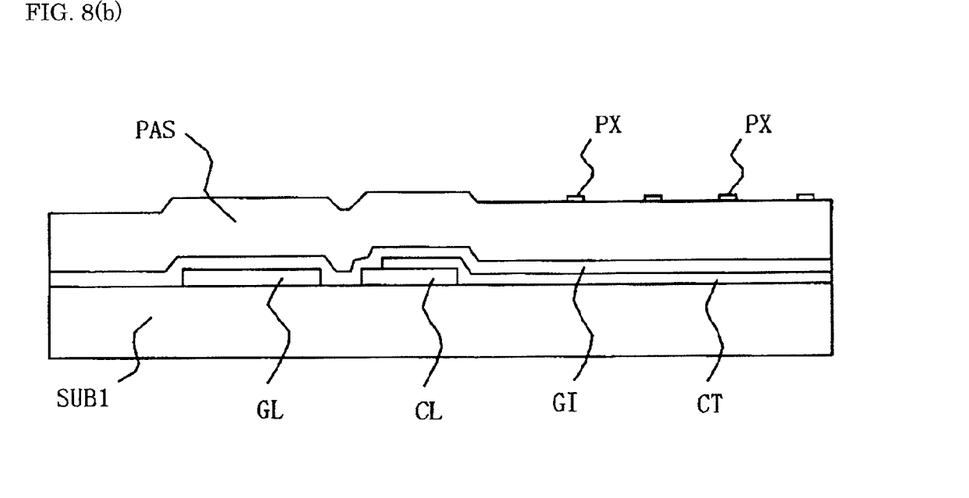

As shown in FIGS. 8(a) and 8(b), the counter voltage signal lines CL are formed in the same layer as the gate signal lines GL, and formed in the direction in which the gate signal lines GL run so as to be adjacent to the gate signal lines GL.

The counter electrodes CT are formed so as to overlap with the counter voltage signal lines CL on the side of the above described counter voltage signal lines CL, and electrically connected to the counter voltage signal lines CL.

In the thus formed liquid crystal display device, the above described counter voltage signal lines CL must be provided so as to keep a certain distance with the gate signal lines GL, in order to achieve electrical isolation from the gate signal lines GL, and in addition, a certain width must be secured in order to reduce the electrical resistance of the counter voltage signal lines CL. Therefore, the above described counter voltage signal lines CL must be formed so as to be mostly within the pixel regions, so that the opening ratio of the pixels can be reduced.

In contrast, in the liquid crystal display device according to the present embodiment, the counter voltage signal lines CL are formed on the upper surface of the protective film PAS so as to overlap with the gate signal lines GL, and therefore, the configuration can allow the counter voltage signal lines CL to be prevented from entering into the pixel regions.

Here, though not shown in FIGS. 1(a) and 4, an orientation film is formed on the surface of the above described substrate SUB1 so as to cover the pixel electrodes PX, and this orientation film sets the direction of initial orientation of the molecules in the liquid crystal which make direct contact with the orientation film.

In addition, though amorphous silicon is used in the semiconductor layers AS and AS' in the above described embodiment, the invention is not limited to this, and polysilicon or the like may be used.

<Counter Voltage Signal Lines CL>

The above described counter voltage signal lines CL are formed of a multilayer body where a transparent conductive film OXL and a metal film MTL are layered in this order, as described above.

As shown in FIG. 1(a), the above described transparent conductive film OXL is formed in the same layer as the pixel electrodes PX. In addition, the above described metal film MTL is formed of such a material having low electrical resistance, such as aluminum or molybdenum. In addition, the transparent conductive film OXL is formed in the lower layer within the counter voltage signal lines CL so as to make direct contact with the counter electrodes CT. In some cases a problem arises with the adhesion between the transparent conductive film and the metal film, due to the difference in the material. In particular, in the case where contact is made in a small region, such as in a contact hole TH2, the problem with the adhesiveness becomes significant. In the present embodiment, the counter voltage signal lines CL and the counter electrodes CT are both made of a transparent conductive film in the contact holes TH2, and therefore, adhesiveness can be secured.

As described above, the counter voltage signal lines CL are formed of a multilayer body where a transparent conductive film OXL and a metal film MTL are layered in this order, and thus, the connection with the above described counter electrodes CT in the above described contact holes TH2 can be made excellent, and at the same time, the electrical resistance of the counter voltage signal lines CL can be reduced a great deal.

Figure 1B:
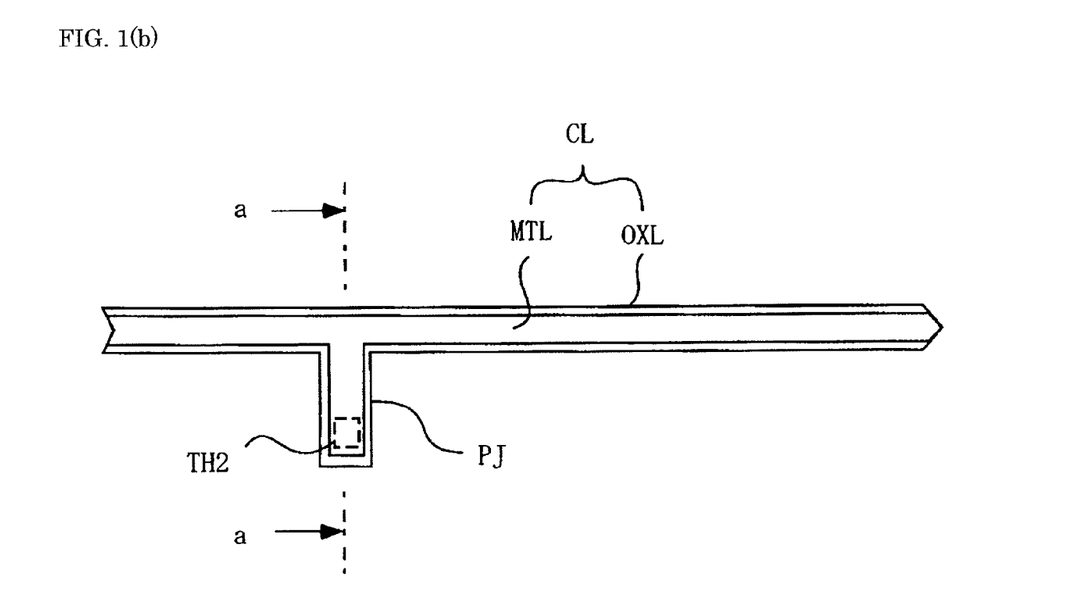

In addition, as shown in FIG. 1(b), which is a plan diagram showing the above described counter voltage signal lines CL, the contour of the above described counter voltage signal lines CL becomes the contour of the transparent conductive film OXL, and the contour of the metal film MTL is within the contour of the above described transparent conductive film OXL in this embodiment.

As is clear from the description below, structures having counter voltage signal lines CL made of a multilayer body where a transparent conductive film OXL and a metal film MTL are layered in this order and pixel electrodes PX made of only a transparent conductive film OXL can be gained in a single process for masking using a photolithographic technology.

Here, the counter voltage signal line CL shown in FIG. 1(b) includes a protrusion PJ which is a connection portion with a counter electrode CT, and the cross section of the counter electrode signal line CL in FIG. 1(a) corresponds to the cross section along line a-a in FIG. 1(b).

<Manufacturing Method>

FIGS. 5(a) to 5(e) are diagrams illustrating the steps in a manufacturing method for a liquid crystal display device having the above described configuration according to one embodiment, where counter voltage signal lines CL and pixel electrodes PX are formed through a single process for masking using a photolithographic technology.

FIGS. 5(a) to 5(e) are cross sectional diagrams along line I(a)-I(a) in FIG. 3. In the following, the manufacturing method is described following the steps.

Figure 5A:
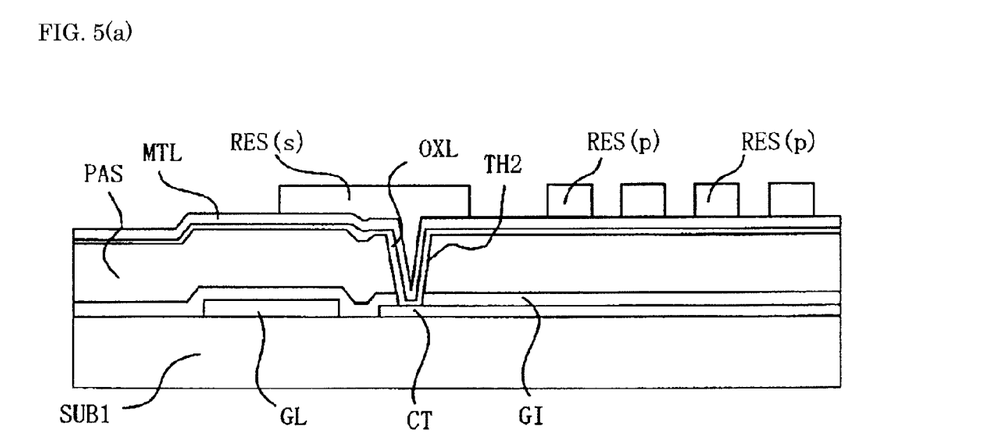
FIGS. 5(a) to 5(e) are diagrams illustrating the main steps in a manufacturing method for the liquid crystal display device according to one embodiment of the present invention.

Step 1 (FIG. 5(a))

Gate signal lines GL, counter electrodes CT, a gate insulating film GI, thin film transistors TFT (not shown) and a protective film PAS are formed on the surface of a substrate SUB1 on the liquid crystal side, and contact holes TH2 for making connection between the below described counter voltage signal lines CL and part of the above described counter electrodes CT are created in the above described protective film PAS.

In addition, a transparent conductive film OXL made of ITO, for example, and a metal film MTL made of Al or Mo, for example, are formed on the surface of the above described protective film PAS in this order so as to cover the above described contact holes TH2.

After that, a photoresist film is formed on the surface of the above described metal film MTL, and undergoes a process for masking using a photolithographic technology, and thus, a photoresist film RES(s) in regions where the above described counter voltage signal lines CL are to be formed and a photoresist film RES(p) in regions where pixel electrodes PX are to be formed remain.

In this case, the above described photoresist RES(s) and photoresist film RES(p) which remain both are wider than the counter voltage signal lines CL and the pixel electrodes PX to be formed. As is clear from the following steps, the above described metal film MTL and transparent conductive film OXL having a predetermined pattern are formed using the above described photoresist film RES(s) and photoresist film RES(p) as a mask, and carrying out so-called side etching on the above described metal film MTL and transparent conductive film OXL.

Figure 5B:
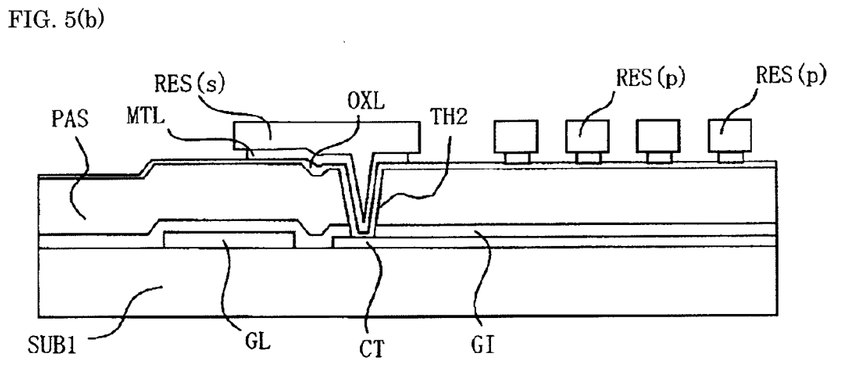

Step 2 (FIG. 5(b))

The above described metal film MTL is etched using the above described photoresist film RES(s) and photoresist film RES(p) as a mask.

In this case, the above described metal layer MTL is etched until the side wall surface of the metal film MTL is inside the side wall surface of the above described photoresist film RES(s) and photoresist film RES(p).

The above described metal film MTL patterned through etching in this step is slightly wider than the counter voltage signal lines CL and the pixel electrodes PX to be gained in regions where the above described counter voltage signal lines CL and pixel electrodes PX are formed.

Figure 5C:
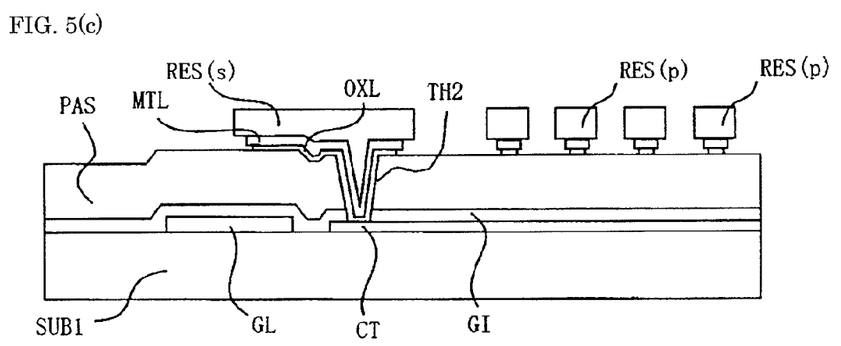

Step 3 (FIG. 5(c))

The above described transparent conductive film OXL is etched using the above described metal layer MTL as a mask, leaving the above described photoresist film RES(s) and photoresist film RES(p) as they are.

In this case, the above described transparent conductive film OXL is etched until the side wall surface of the transparent conductive film OXL is inside the side wall surface of the above described metal film MTL formed in a layer above the transparent conductive film OXL.

The above described transparent conductive film OXL patterned through etching in this step is formed so as to have the same width as the counter voltage signal lines CL and the pixel electrodes PX to be gained in regions where the above described counter voltage signal lines CL and pixel electrodes PX are formed.

Figure 5D:
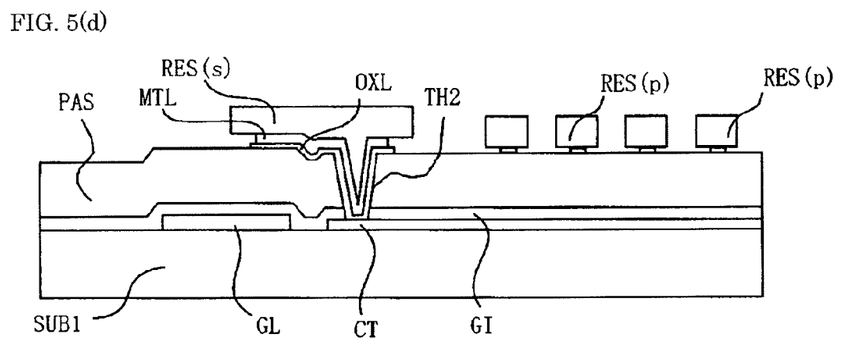

Step 4 (FIG. 5(d))

The above described metal layer MTL is etched using the remaining resist film RES(s) and photoresist film RES(p) as a mask.

In this case, etching continues until the metal layer MTL is gone in regions where the pixel electrodes PX are formed.

As described above, the pixel electrodes PX are formed so as to have a line pattern, and therefore, the above described metal layer MTL above regions where the pixel electrodes PX are formed has a small width, and is completely removed when the above described etching continues.

Meanwhile, the metal layer MTL remains on the transparent conductive film OXL in regions where the counter voltage signal lines CL having a relatively large area are formed in such a state that the side wall surface is inside the side wall surface of the transparent conductive film OXL formed in a layer beneath the metal layer MTL.

Figure 5E:
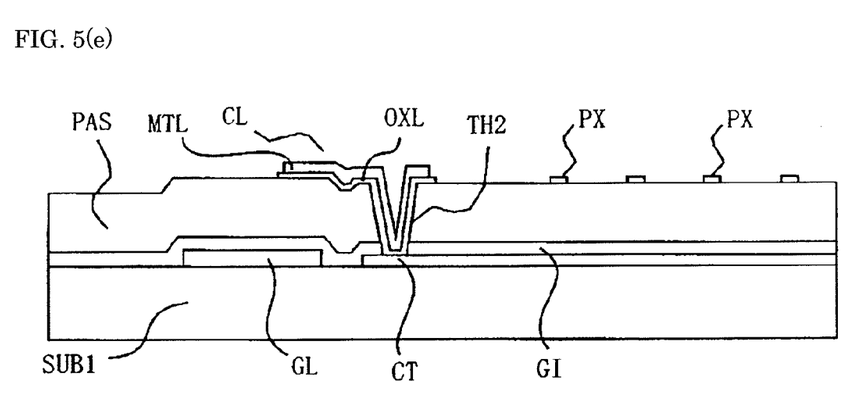

Step 5 (FIG. 5(e))

The above described photoresist film RES(s) and photoresist film RES(p) are removed.

As a result, pixel electrodes PX are formed of a transparent conductive film OXL, and counter voltage signal lines CL are formed of a multilayer body where a transparent conductive film OXL and a metal film MTL are layered in this order.

Here, the manufacturing method according to the embodiment shown in FIG. 5 is a case where the counter voltage signal lines CL and the pixel electrodes PX are formed in a single process for masking using a photolithographic technology, as described above.

However, the invention is not limited to this method, and the counter voltage signal lines CL and the pixel electrodes PX can be formed in a single process for masking using a half-tone mask, for example.

The half-tone mask is formed as a mask having a completely light blocking region, a half light transmitting region and a completely light transmitting region, and a photoresist mask having two-step films can be formed by exposing a photoresist film to light using this mask and developing the photoresist film.

In addition, the respective films in the multilayer film (for example a multilayer film where a transparent conductive film and a metal film are layered in this order) in a layer beneath the photoresist mask can be etched to a predetermined pattern using this photoresist mask.

When etching of the film in the upper layer is completed, the above described photoresist mask is removed from the surface in the direction of the depth, so as to partially remain as a pattern for etching the film in the lower layer.

In addition, it is not necessary to carry out a single process for masking in order to form the counter voltage signal lines CL and the pixel electrodes PX shown in FIG. 1(a). The transparent conductive film OXL and the metal film MTL may be separately and selectively etched and patterned using a photolithographic technology.

<Second Embodiment>

Figure 6:
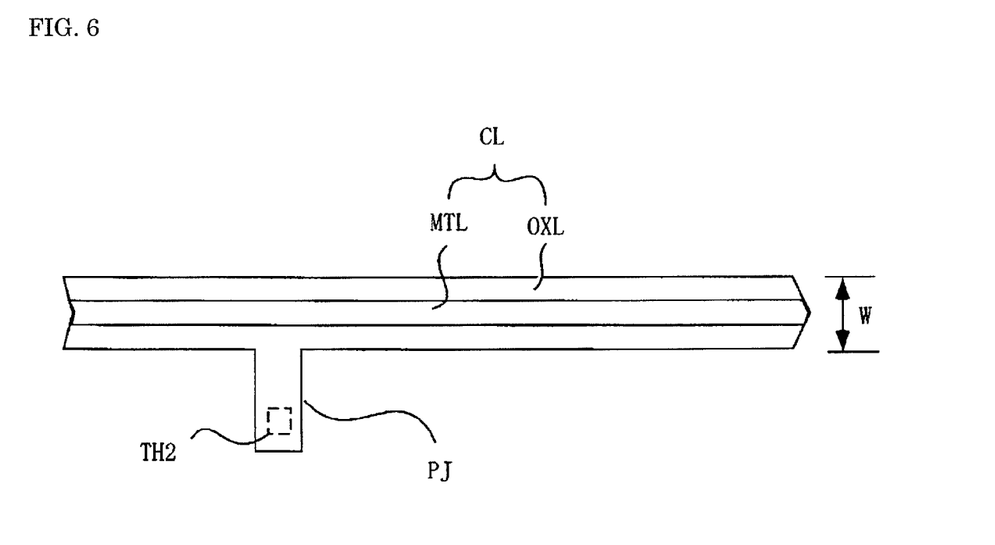
FIG. 6 is a plan diagram showing a main portion of the liquid crystal display device according to another embodiment of the present invention.

FIG. 6 is a diagram showing the liquid crystal display device according to another embodiment of the present invention, and corresponds to FIG. 1(b).

The configuration is different from the case of FIG. 1(a) in that the width W of the counter voltage signal lines CL, that is to say, the width W of the transparent conductive film OXL for forming the counter voltage signal lines CL, is greater.

As a result, the above described counter voltage signal lines CL have approximately the same width as the above described gate signal lines GL, and thus, can overlap with the gate signal lines GL so as to cover approximately the entire region of the above described gate signal lines GL.

In addition, the metal film MTL layered on the above described transparent conductive film OXL is formed so that the contour is a considerable distance inside the contour of the above described transparent conductive film OXL. That is to say, the protrusions PJ of the above described counter voltage signal lines CL are formed only of the transparent conductive film OXL, and have a configuration where the metal film MTL is not layered. As a result, the efficiency of transmission in the protrusion PJ portions can be increased, and it becomes possible to increase the opening ratio of the pixel regions. In addition, the above described metal film MTL is formed in the direction in which the counter voltage signal lines CL extend, and therefore, reduction in the electrical resistance can be achieved.

<Third Embodiment>

Figure 7:
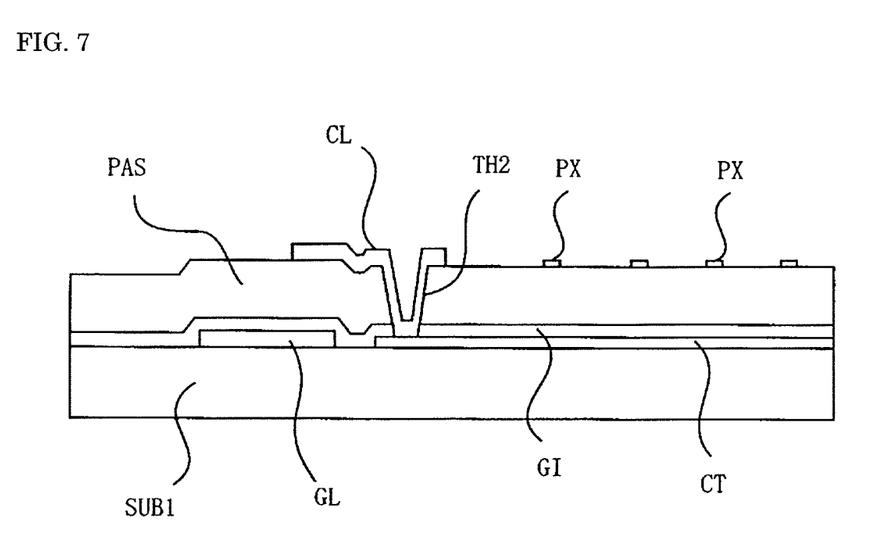
FIG. 7 is a cross sectional diagram showing a main portion of the liquid crystal display device according to another embodiment of the present invention.

FIG. 7 is a diagram showing the liquid crystal display device according to another embodiment of the present invention, and corresponds to FIG. 1(a).

The configuration is different from the case of FIG. 1(a) in that the counter voltage signal lines CL are formed of only a metal film MTL.

In this case also, the above described counter voltage signal lines CL, excluding the protrusions PJ, are formed so as to overlap with the gate signal lines GL, and thus, the opening ratio of the pixels is higher in the configuration.

In addition, though in the above described embodiment, a material made of ITO (indium tin oxide) is used for the transparent conductive film OXL, the material is not limited to this, and another transparent conductive film, such as of IZO (indium zinc oxide), may be used.

In addition, though in the above described embodiment, aluminum and molybdenum are cited as examples of the metal film MTL, other metals, such as copper, chromium and tantalum, can be used in addition to these, and furthermore, alloys of the same can be used.

The above described embodiments may be used alone or combined for use. This is because the effects of the respective embodiments can be gained when used alone or collectively.

The invention claimed is:

1. A liquid crystal display device comprising:
    a liquid crystal panel including liquid crystal sealed between a pair of substrates;
    a plurality of gate signal lines and a plurality of drain signal lines formed to cross each other on one of said pair of substrates;
    a pixel region surrounded by a pair of adjacent gate signal lines and a pair of adjacent drain signal lines;
    a thin film transistor provided in the pixel region and connected to at least one of the pair of adjacent gate signal lines and at least one of the pair of drain signal lines;
    a pixel electrode provided in the pixel region and configured to be supplied with a video signal via the thin film transistor; and
    a counter electrode provided in the pixel region and configured to be supplied with a reference signal via a counter voltage signal line, the reference signal being a reference for the video signal, wherein:
    said counter electrode is comprised of a transparent conductive film,
    said pixel electrode is comprised of a transparent conductive film, on a liquid crystal side relative to said counter electrode,
    an insulating film is provided between said counter electrode and said pixel electrode,
    said counter voltage signal line is formed to extend in a longitudinal direction which is the same direction in which said plurality of gate signal lines longitudinally extend so as to overlap with at least one of said plurality of gate signal lines,
    said insulating film is provided between said counter voltage signal line and the at least one of said plurality of gate signal lines, and
    said counter voltage signal line is at least partially formed between said counter electrode and said liquid crystal and is electrically connected to said counter electrode via a contact hole formed in said insulating film,
    said pixel electrode and said counter voltage signal line are formed on said insulating layer which is formed between the pixel electrode and the counter electrode so that the pixel electrode is located closer to the liquid crystal than the counter electrode, and
    wherein said pixel electrode and said counter voltage signal line are formed in the same layer.

2. The liquid crystal display device according to claim 1, characterized in that said counter voltage signal line is provided with protrusions which extend in such a direction as to cross the counter voltage signal lines, and the protrusions are formed so as to cover contact holes created in said insulating film.

3. The liquid crystal display device according to claim 2, characterized in that said counter voltage signal line is comprised of a multilayer body including a transparent conductive film and a metal film.

4. The liquid crystal display device according to claim 3, characterized in that a contour of said metal film is within a contour of said transparent conductive film when said counter voltage signal lines are viewed in a plane view.

5. The liquid crystal display device according to claim 3, characterized in that said protrusions are comprised of a multilayer body including a transparent conductive film and a metal film.

6. The liquid crystal display device according to claim 3, characterized in that said protrusions are comprised only of a transparent conductive film.

7. The liquid crystal display device according to claim 3, characterized in that said counter voltage signal line is comprised of a metal film.

8. The liquid crystal display device according to claim 1, characterized in that said counter electrode and said gate signal lines are formed in the same layer.

9. The liquid crystal display device according to claim 1, wherein said counter voltage signal line covers at least a part of the at least one of the plurality of said gate signal lines in the direction parallel to the direction in which said drain signal lines extend.

10. The liquid crystal display device according to claim 9, wherein a width of said counter voltage signal line is narrower than a width of the at least one of said plurality of gate signal lines.

11. The liquid crystal display device according to claim 1, wherein a width of said counter voltage signal line is narrower than a width of the at least one of said plurality of gate signal lines.

12. The liquid crystal display device according to claim 1, wherein said insulating film is provided between said counter voltage signal line and the at least one of said plurality of gate signal lines at an area where the counter voltage signal line overlaps the at least one of said plurality of gate signal lines.

13. The liquid crystal display device according to claim 1, wherein said counter voltage signal line is comprised of a multilayer body including a transparent conductive film and a metal film, and wherein said pixel electrode is comprised of the same transparent conductive film as said counter voltage signal line and is spaced apart from the counter voltage signal line on said insulating layer.

14. A liquid crystal display device comprising:
- a liquid crystal panel including liquid crystal sealed between a pair of substrates;
- a plurality of gate signal lines and a plurality of drain signal lines formed to cross each other on one of said pair of substrates;
- a pixel region surrounded by a pair of adjacent gate signal lines and a pair of adjacent drain signal lines;
- a thin film transistor provided in the pixel region and connected to at least one of the pair of adjacent gate signal lines and at least one of the pair of drain signal lines;
- a pixel electrode provided in the pixel region and configured to be supplied with a video signal via the thin film transistor; and
- a counter electrode provided in the pixel region and configured to be supplied with a reference signal via a counter voltage signal line, the reference signal being a reference for the video signal, wherein:
- said counter electrode is comprised of a transparent conductive film,
- said pixel electrode is comprised of a transparent conductive film, on a liquid crystal side relative to said counter electrode,
- an insulating film is provided between said counter electrode and said pixel electrode,
- said counter voltage signal line is comprised of a straight line part and a protrusion part, the straight line part extending in a direction in which the gate signal line extends, the protrusion part extending in a direction as to cross the straight line part,
- wherein the width of straight line part of said counter voltage signal line is narrower than the width of the gate signal line, and in a plane view, the straight line part of said counter voltage signal line is wholly formed within the gate signal line,
- said insulating film is provided between said counter voltage signal line and the at least one of said plurality of gate signal lines, and
- said counter voltage signal line is at least partially formed between said counter electrode and said liquid crystal and is electrically connected to said counter electrode via a contact hole formed in said insulating film,
- said pixel electrode and said counter voltage signal line are formed on said insulating layer which is formed between the pixel electrode and the counter electrode so that the pixel electrode is located closer to the liquid crystal than the counter electrode, and
- wherein said pixel electrode and said counter voltage signal line are formed in the same layer.

15. The liquid crystal display device according to claim 14, characterized in that said protrusion part of said counter voltage signal line is formed so as to cover contact holes created in said insulating film.

16. The liquid crystal display device according to claim 15, characterized in that said counter voltage signal line is comprised of a multilayer body including a transparent conductive film and a metal film.

17. The liquid crystal display device according to claim 16, characterized in that a contour of said metal film is within a contour of said transparent conductive film when said counter voltage signal lines are viewed in a plane view.

18. The liquid crystal display device according to claim 14, characterized in that said counter electrode and said gate signal lines are formed in the same layer.

19. The liquid crystal display device according to claim 14, wherein said counter voltage signal line covers at least a part of the at least one of the plurality of said gate signal lines in the direction parallel to the direction in which said drain signal lines extend.

20. The liquid crystal display device according to claim 14, wherein said insulating film is provided between said counter voltage signal line and the at least one of said plurality of gate signal lines at an area where the counter voltage signal line overlaps the at least one of said plurality of gate signal lines.

21. The liquid crystal display device according to claim 14, wherein said counter voltage signal line is comprised of a multilayer body including a transparent conductive film and a metal film, and wherein said pixel electrode is comprised of the same transparent conductive film as said counter voltage signal line and is spaced apart from the counter voltage signal line on said insulating layer.

* * * * *